(12) United States Patent
Johnson et al.

(10) Patent No.: US 9,716,926 B2
(45) Date of Patent: Jul. 25, 2017

(54) REMOTE WEATHER SENSING FOR HARVESTING CONDITIONS

(75) Inventors: Gerald R. Johnson, Hesston, KS (US); Grant L. Good, Moundridge, KS (US); Timothy Dan Buhler, Newton, KS (US)

(73) Assignee: AGCO Corporation, Duluth, GA (US)

( * ) Notice: Subject to any disclaimer, the term of this patent is extended or adjusted under 35 U.S.C. 154(b) by 1320 days.

(21) Appl. No.: 13/417,267

(22) Filed: Mar. 11, 2012

(65) Prior Publication Data

US 2012/0256760 A1 Oct. 11, 2012

Related U.S. Application Data

(60) Provisional application No. 61/451,347, filed on Mar. 10, 2011.

(51) Int. Cl.
| | |
|---|---|
| *G08B 23/00* | (2006.01) |
| *H04Q 9/00* | (2006.01) |
| *G01W 1/00* | (2006.01) |
| *G05D 1/00* | (2006.01) |
| *G06F 15/173* | (2006.01) |

(52) U.S. Cl.
CPC .......... *H04Q 9/00* (2013.01); *H04Q 2209/30* (2013.01); *H04Q 2209/40* (2013.01); *H04Q 2209/75* (2013.01); *H04Q 2209/823* (2013.01)

(58) Field of Classification Search
USPC .......... 340/870.02, 870.1; 709/220; 718/103
See application file for complete search history.

(56) References Cited

U.S. PATENT DOCUMENTS

| | | | | |
|---|---|---|---|---|
| 2002/0072361 A1* | 6/2002 | Knoblach | .......... | H04B 7/18576 455/431 |
| 2008/0114497 A1* | 5/2008 | Giles | .......... | A01B 79/005 700/283 |
| 2009/0295587 A1* | 12/2009 | Gorman, Jr. | .......... | G01W 1/06 340/601 |
| 2011/0035491 A1* | 2/2011 | Gelvin | .......... | H04L 67/12 709/224 |
| 2012/0109387 A1* | 5/2012 | Martin | .......... | A01G 25/167 700/284 |

* cited by examiner

*Primary Examiner* — Jack K Wang

(57) ABSTRACT

Systems and methods for remote query of weather conditions at an agricultural machine use an onboard telemetry unit as a gateway for communication with the machine. The telemetry unit can be coupled to both the machine's electrical system at the machine, and a machine's controller area network (CAN). A user can call up the machine's telemetry unit using a cell phone or personal computer to retrieve weather data such as temperature, humidity and rainfall from a weather station coupled to the machine. A system can provide an alert when a desired predetermined condition is present at a machine, for example an alert that a harvesting or baling condition is present. The system can also enable an operator or fleet manager to check the state of various devices or apparatus at a machine, enabling remote diagnostics via the onboard telemetry unit.

13 Claims, 6 Drawing Sheets

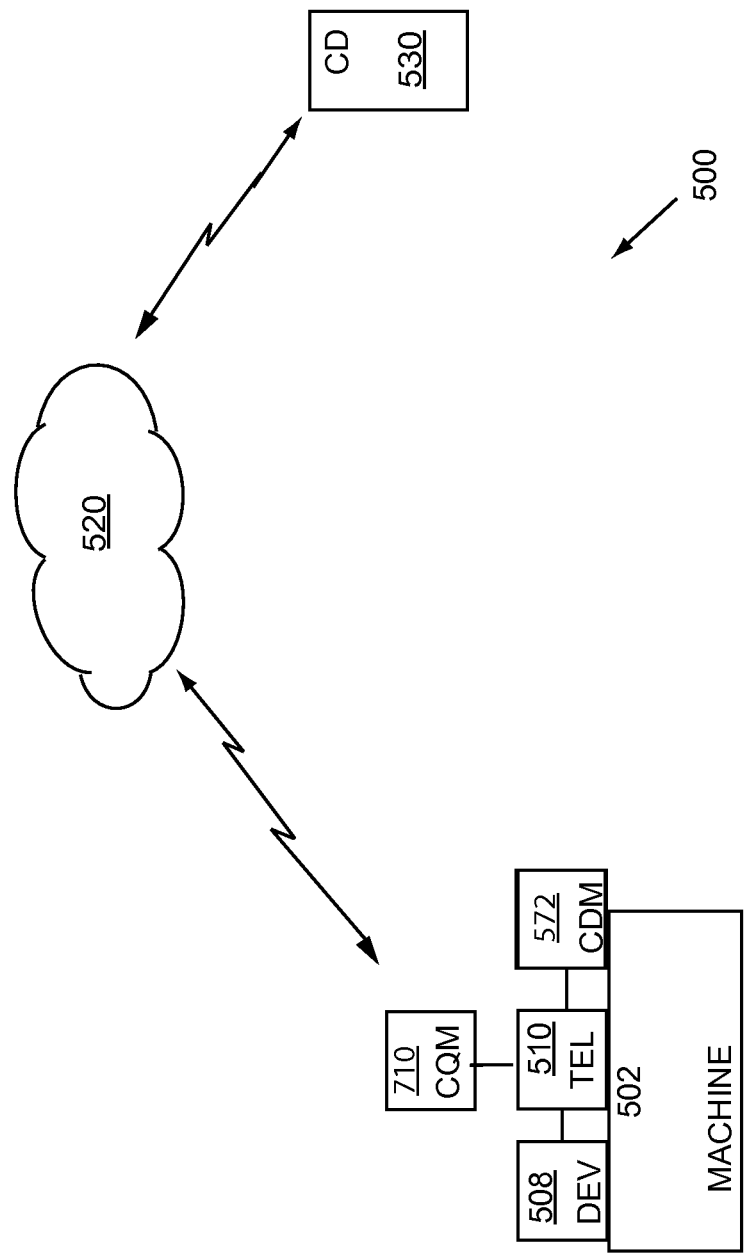

REMOTE WEATHER SENSING FOR HARVESTING CONDITIONS

CROSS-REFERENCE TO RELATED APPLICATIONS

This Application claims priority to U.S. Provisional Application No. 61/451,347 filed Mar. 10, 2011, entitled "Remote Weather Sensing For Harvesting Conditions."

FIELD OF INVENTION

This invention pertains generally to methods and systems for supporting agricultural operations, and more particularly to remote sensing operations using telemetry.

BACKGROUND OF INVENTION

In general, remote operation of consumer devices has primarily focused on the use of radio waves from a relatively proximate, typically line-of-sight source. Manipulating a remote-controlled airplane, robot and the like, or unlocking a car with a key fob device, immediately come to mind as common examples of remote operations. In such applications, a small transmitter in a control device can generate a signal that can be detected at a receiver at the controlled device. Power and frequency constraints reduce the likelihood of interference at the device receiver, as well as limit the range between the device and its controller.

In the context of vehicles, the concept of remotely controlling some aspect of an automobile has been further expanded in the development of user assistance systems such as ONSTAR®, which offers subscription services, such as emergency road service and navigation assistance. A user can depress a button at an onboard ONSTAR® console to connect with a customer service operator who can coordinate the assistance of emergency personnel, or the transmission of signals to unlock a vehicle. In the event of an accident, an onboard device can connect with an ONSTAR® center to prompt a customer service representative to call the vehicle to check on the condition of the passengers.

In general, the ONSTAR® system relies on dedicated proprietary equipment and third party personnel to remotely facilitate select vehicle-related services for subscribers. A triggering condition at the vehicle, such as an airbag deployment, or user input, can activate an ONSTAR® device to call a service representative who can perform some vehicle-related action on behalf of the subscriber, who is typically at the vehicle.

While adequate for its intended purposes, there are needs that the ONSTAR® system, and others of its ilk, fails to address. For instance, there can be a need to perform a remote operation, or check environmental conditions at an unattended or turned off vehicle. Such needs can be particularly acute in the context of agricultural machines, as agricultural activities are restricted by economic, regulatory, and environmental constraints. For example, some operations, such as harvesting hay or applying pesticides, can only be performed under specific environmental conditions at the particular field. A fleet of agricultural machines can operate over a large area as operators can be tasked to perform different procedures at different fields with different equipment. While weather patterns can affect a broad region, at the same time, localized cells can often cause sporadic events that affect smaller areas. Conditions at one field can vary greatly from conditions at another field. Accordingly, operations that cannot be performed in a first field, may be able to be performed in a second field that is experiencing different weather conditions.

For example, hay must take on a certain amount of moisture before being cut. In certain North American regions, proper harvesting conditions only occur after dark, requiring an operator to make a trip at night, or call a resident in the vicinity at night, to check humidity levels at the field that needs to be harvested. Fields separated by great distances have to be checked separately to determine if local conditions are conducive for the work activity to be performed. Likewise, application of pesticides is limited by wind conditions at the site. Again, since wind conditions can vary among various fields, a report at one field may not be relevant at another, requiring each operator to make the effort to check the conditions at his assigned field. Once there, he may learn that conditions at his field are not good for spraying. Conditions at other fields may be conducive, but an operator won't know until he checks conditions at each field, which could prove a time-consuming process.

When an operator makes a trip to a field only to discover that environmental conditions prohibit him from performing a desired task, both time and money can be lost, particularly when the field is quite a distance from his home. His consternation can be multiplied when the futile trip is made at night. There is a need for a means to remotely check ambient conditions at a parked vehicle so that an operator can make an informed decision before traveling commencing preparations for a work assignment. While stand-alone weather stations exist, they are not mobile, and can only check conditions for a limited area.

It would behoove the owner, fleet manager, or operator of an agricultural machine to have the ability to remotely query an unattended agricultural machine to determine local environmental conditions. There is a need for a mobile weather station that can be remotely queried. Because different operators may desire different types of information depending on the fleet work schedule, there is a need for a common method that can be used by multiple operators to perform a variety of operations at machines at remote locations. There is a need for a method and system that allows an operator or fleet manager to directly query a machine in order to better perform his particular work assignment, without requiring the services of a third party, whose intervention can both delay operations and increase costs. There is a need for a system and method for remote sensing that can be implemented throughout a machine fleet without significant investment in new equipment. There is further a need for a system and method for remote operations that can be implemented on legacy machines without the need for expensive retrofitting procedures.

BRIEF DESCRIPTION OF THE DRAWINGS

FIG. 7 shows an example system of the invention.

OVERVIEW

Figure 1:
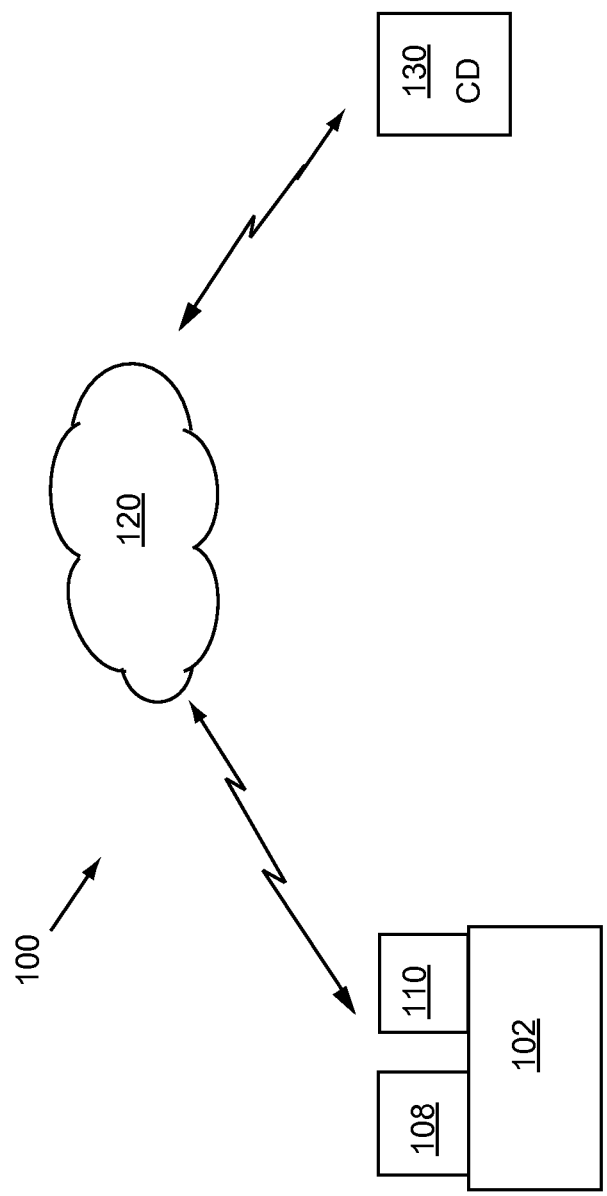
FIG. 1 shows an example system of the invention.

Many agricultural machines are equipped with a telemetry unit for the recording and one-way transmission of machine data from the machine to a back office. In a system of the present invention, a telemetry unit can communicate with a machine in a bidirectional manner, facilitating remote query by an operator or fleet manager. A user can use a communication device such as, but not limited to, a cell phone, smart phone or modem-equipped personal computer to communicate with the telemetry unit and provide remote query and control commands. The telemetry unit can provide the commands to, and receive data from, devices at the machine via a communications bus of a controller area network (CAN) at the machine. In an exemplary embodiment, a weather station can be coupled to the CAN, and an operator can use the telemetry unit as a gateway for retrieving data pertaining to ambient environmental conditions at the machine. For example, an operator or fleet manager can call up the telemetry unit and request the current humidity at the machine to determine whether conditions are conducive for harvesting a hay crop.

In an example method, operator can use a cell phone to call the telemetry unit and request weather sensor data. In response to receiving the call, the telemetry unit can receive data from a weather sensor at the machine. For example, the telemetry unit can be configured to query a weather sensor for data. In a further example, the telemetry unit can be configured to energize a CAN, prompting nodes to broadcast sensor data via a CAN communications bus. The telemetry unit can then transmit the weather data to the user device over a communications network that can include wired, wireless, cellular and packet-switched communications. The invention enables an operator or fleet manager to contact the telemetry unit to find out the current state of the weather at a machine, a procedure that can be much quicker, cheaper, and possibly more reliable than making a trip to the vehicle, or contacting a resident who lives in the vicinity of the machine.

A system of the invention can be configured to provide an alert when a certain condition is present at the machine. For example, a system can include a telemetry unit configured for bidirectional communication with a user communication device, and communicatively coupled to a sensor at a machine; and a condition determination module (CDM) configured for using the sensor data to determine whether a predetermined condition exists at the machine. In an exemplary embodiment, both the telemetry unit and the sensor are coupled to a machine controller area network (CAN). In an example embodiment, the CDM is configured to use weather data to determine whether a particular condition, such as a harvesting, baling or spraying condition is present at a machine. The CDM can be configured to determine whether current weather characteristics satisfy requirements for harvesting, such as a moisture level falling within a predetermined range. If the CDM determines that conditions are good for harvesting, an alert can be provided to a user. For example, a text message can be sent to a user's cell phone, or a phone call made to an operator. The system can query the machine, relieving the operator of making periodic phone calls, particularly advantageous aspect when it saves the user from having to set his alarm clock to awaken and remind him to query a harvester machine during nighttime hours.

The invention provides a communication gateway that does not require dedicated equipment or costly retrofitting operations. A system and method of the invention enable direct communication between a user and his machine, without the need for third party intervention or subscription fees.

Detailed Description of Example Embodiments

As required, example embodiments of the present invention are disclosed. The various embodiments are meant to be non-limiting examples of various ways of implementing the invention and it will be understood that the invention may be embodied in alternative forms. The present invention will be described more fully hereinafter with reference to the accompanying drawings in which like numerals represent like elements throughout the several figures, and in which example embodiments are shown. The figures are not necessarily to scale and some features may be exaggerated or minimized to show details of particular elements, while related elements may have been eliminated to prevent obscuring novel aspects. The specific structural and functional details disclosed herein should not be interpreted as limiting, but merely as a basis for the claims and as a representative basis for teaching one skilled in the art to variously employ the present invention. For example, while the exemplary embodiments are discussed in the context of an agricultural vehicle, it will be understood that the present invention is not limited to that particular arrangement. Likewise functions discussed in the context of being performed by a particular module or device may be performed by a different module or device, or combined, without departing from the scope of the claims.

Turning now to the figures, the present invention will be described in detail. Referring to FIG. 1, a system 100 for remote query and control can include an agricultural machine 102 equipped with a telemetry unit 110 coupled to the agricultural machine and configured to communicate with a user communication device 130 via a communications network 120. By way of example, but not limitation, the agricultural machine 102 can be in the form of a combine harvester, tractor, sprayer, or windrower. In an example embodiment, the telemetry unit 110 can be communicatively coupled to one or more devices 108 at the machine 102. The device 108 can be an implement, sensor, or other apparatus at the machine 102, or a controller or control circuit associated with an implement, sensor or apparatus.

The machine 102 can be equipped with a variety of different implements, such as a cultivator, a header, a boom, etc, and be configured to perform various agricultural related tasks, such as harvesting crop, cultivating, applying crop products, irrigating, etc. It can also be equipped with one or more sensors that can be associated with an implement or other apparatus associated with the machine 102 and configured to detect the state of a device at the machine or the machine environment. In an example embodiment, a sensor can be in the form of a weather station configured with devices to detect weather characteristics such as rainfall, humidity, temperature, and the like.

In an exemplary embodiment, the user communication device 130 can be in the form of a cell phone or smart phone, and the network 120 can include a cellular network, enabling an operator to directly call up the telemetry unit 110. In a further embodiment, the user communication device 130 can be in the form of a personal computer equipped with a modem, so that a fleet manager can contact the agricultural vehicle 102 from a back office location using the internet. The telemetry unit 110 can be configured to serve as a gateway to the machine 102, using its existing communication architecture to enable remote control and query of the device 108 directly by a user associated with the machine. No third party intermediary is required in order for an operator or manager to query the machine 102.

Figure 2:
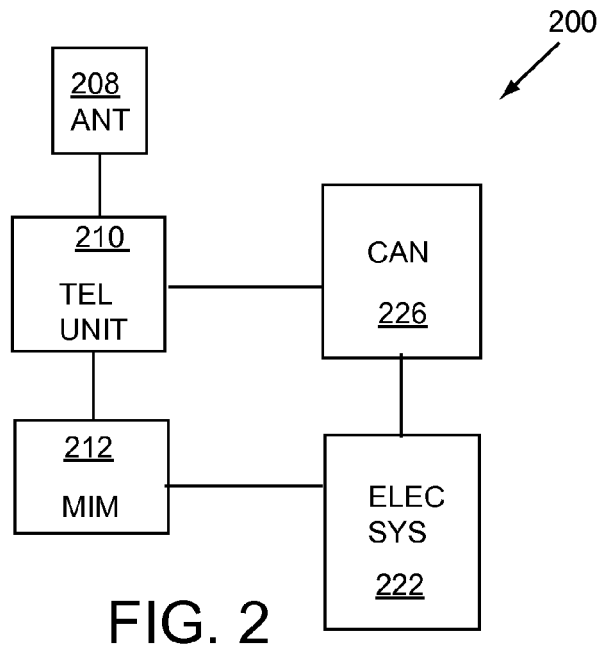
FIG. 2 shows an example system of the invention.
Figure 4:
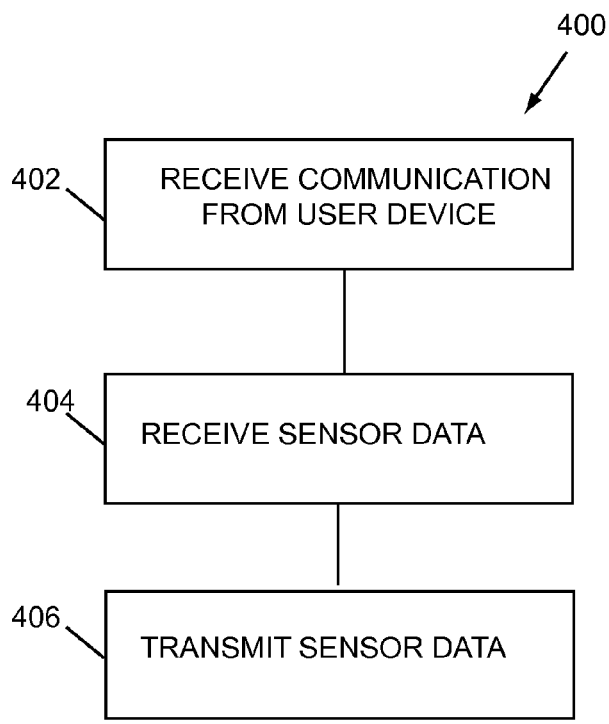
FIG. 4 shows a flow diagram of an example method.

FIG. 2 depicts an example system 200 for remote query and control. The system 200 can include a telemetry unit 210 that can be configured to couple with a multiplexing interface module (MIM) 212 that can interface the telemetry unit 210 with an electrical system at the machine. In an exemplary embodiment, the telemetry unit 210 is embodied as a telematics device configured for use on an agricultural machine. In an exemplary embodiment, the telemetry unit 210 can include, or be coupled to, a modem, such as a GPRS modem configured for communication over a cellular network. The telemetry unit 210 can be coupled to an antenna 208 for transmission and reception of signals. In an exemplary embodiment, the antenna 208 is a combined GPS and GPRS antenna, enabling reception of satellite signals for geo-positioning as well as communication signals over a cellular network. In an exemplary embodiment, the telemetry unit 210 can include a power supply, such as a battery, enabling its operation even when the host machine is turned OFF.

The MIM 212 can provide an interface between the telemetry unit 210 and a machine's electrical system 222 which can include a machine's battery. The MIM 212 can include the software, hardware and/or firmware required to adequately interface the telemetry unit 210 to enable remote query operations. In an example embodiment, the MIM 212 couples the telemetry unit 210 to the electrical system 222 so that power can be provided to the CAN 226 and the telemetry unit 210 can operate in coordination with the CAN 226 to communicate with sensors and devices at the machine 102.

In an exemplary embodiment, the CAN 226 is a controller area network as known in the art as a multi-master short message broadcast system based on an International Standardization Organization (ISO) defined serial communications bus (for example, the ISO 11898 standard). Originally developed by Bosch for the automotive industry, the use of CAN systems has expanded to include automation, medical and manufacturing applications. The telemetry unit 210 can be configured for coupling to the CAN 226, for example it can include ports that enable it to connect to a communications bus for the CAN 226. Thus, in an example embodiment, the telemetry unit 210 can be coupled to both the electrical system 222 and the CAN 226.

Figure 3:
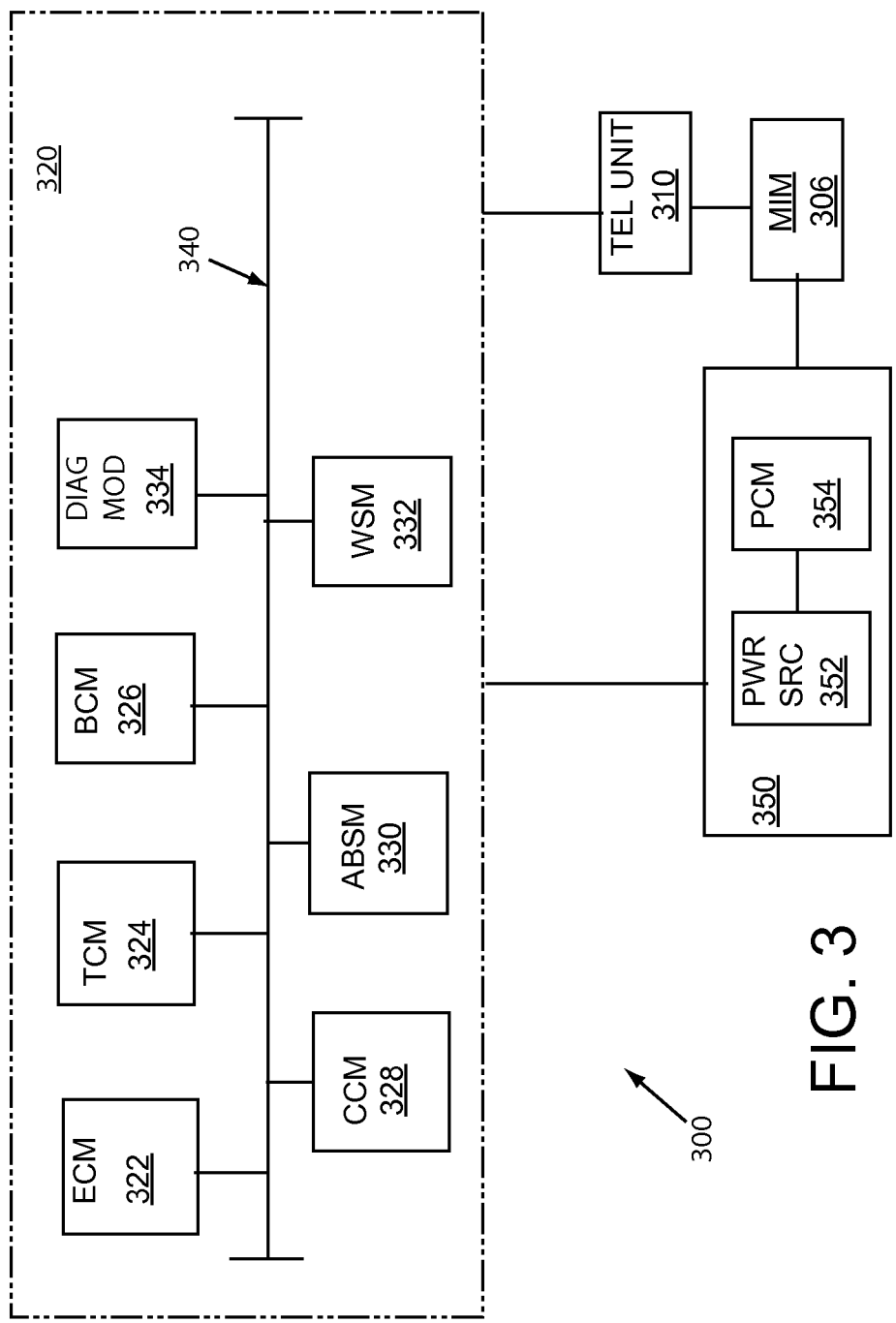
FIG. 3 shows an example system of the invention.

FIG. 3 shows an example system 300 that can be used to facilitate remote query and operation of the machine 102. The system 300 can include a telemetry unit 310 coupled to a CAN 320 that can include several nodes, such as but not limited to: an engine control module (ECM) 322, a transmission control module (TCM) 324, a body control module (BCM) 326, a climate control module (CCM) 328, an anti-lock braking system module (ABSM) 330, and a weather station module (WSM) 332. Each node can comprise a transceiver (also referred to as a CAN controller) configured to transmit and receive messages over a serial communications bus 340 to which each node is coupled. In addition, each node can comprise a host processor coupled to the CAN controller and configured for composing messages to be transmitted, and for determining content of messages received. In an exemplary embodiment, one or more sensors, actuators, device or other apparatus can be coupled to the host processor. In an example embodiment, a CAN node can include a host processor connected to a sensor that can be configured to detect a state at the machine, for example an environmental state, or a state of an apparatus at the machine.

Each CAN node requires power for its processing and communication operations. FIG. 3 shows a power circuit 350 configured to provide power to the CAN 320. In an example embodiment, the power circuit 350 is part of the machine's electrical system 222. The power circuit 350 can include, but not be limited to, a power source 352, which, in an example embodiment, can be coupled to a power control module (PCM) 354. In an exemplary embodiment, the power source 352 is embodied as a battery, for example, a machine battery used to charge a starter motor, lights and ignition system of the machine. In a further example, a separate battery at the machine can be used to power the CAN 320. While the machine or vehicle is turned on, its charging system can charge its battery. However, when the vehicle is turned OFF, the charging system no longer operates. To prevent the CAN 320 from draining a machine battery while a machine is turned OFF, the power control module 354 can be coupled to the power source 352 and configured to control power provided to the CAN 320. For example, the PCM 354 can comprise a power relay that can switch power to the CAN 320 from the power source 352 on or off. In an example embodiment, a power relay circuit can be coupled to the machine's ignition system so that power is provided to the CAN 320 when the ignition is turned on, and switched off when the ignition is turned off. In another example, a PCM can further include a power controller device such as, but not limited to, a CAN user console, configured to enable or prevent battery power to be provided to the CAN 320. In an exemplary embodiment, the PCM 354 is part of the electrical system for the machine 102, and a telemetry unit of the invention can be configured to couple with an existing PCM for a machine's electrical system, reducing the number of parts required in order to install and implement the invention on a legacy machine.

In an exemplary embodiment, the telemetry unit 310 is configured for bidirectional communication, having the software, hardware, and/or firmware required for communication with a user device such as a cell phone or personal computer over the communications network 120. The telemetry unit 310 can be configured with CAN high and CAN low ports for electrical coupling to the CAN 320, and can include the hardware, software, or firmware necessary to enable the telemetry unit to function as a CAN node, sending and receiving messages to and from other CAN nodes via the CAN bus 340. In an example embodiment, the telemetry unit 310 can be coupled to a machine's electrical system. For example, the telemetry unit 310 can include an output port that can provide an output that can enable power to be provided to the CAN 320. The telemetry unit 310 can include hardware, software, and or firmware configured to drive an output at its output port in response to receiving communication from the user device 130.

In a further embodiment, rather than coupling to a power control module previously present at the machine, an MIM of the invention can include a power relay circuit that can be coupled to the power source 352 and the CAN 320 so that power can be provided to the CAN 320 in response to telemetry unit 310 output. Thus, in a system of the invention, the telemetry unit 310 can be configured to provide power to the CAN 320 by driving an output used to couple the power source 352 to the CAN 320. In addition, the telemetry unit 310 can be configured to provide power to the CAN 320 through the telemetry unit 310 itself, when the MIM 306 couples power from the power source 352 to the telemetry unit 310, which in turn can provide it to the CAN 320 through its CAN ports. Either way, the telemetry unit 310 can function as a gateway for communication that can energize the CAN 320.

FIG. 400 shows a flow diagram of an example method that can be used for remote query of a machine. At block 402, the telemetry unit 310 can receive a communication signal from a user device. In an example method, an operator can use a cell phone to communicate with the telemetry unit 310 over the communications network 120. As another example, a fleet manager can contact the telemetry unit 312 via a laptop at a back office, over a communications network that can include packet-switched and cellular communications.

The communication signal can be detected at the antenna 208 and provided to the telemetry unit 310 that is configured with the software, hardware and/or firmware to receive the communication signal and generate a response. At block 404, the telemetry unit 310 can receive data from a sensor device. For example, the telemetry unit 310, performing as a node in the CAN system 320 can receive weather-related data from the WSM 332 via the CAN bus 340. By way of example, but not limitation, the WSM 332 node can be associated with a weather station on board the machine 102 that can include, but not be limited to, a resistance temperature device (RTD) for detecting temperature, an anemometer, such as a sonic anemometer, for measuring wind speed, a barometer for measuring air pressure, a hygrometer for measuring the amount of moisture in the air, a rain gauge for measuring rainfall and the like, can be configured to provide data from the various weather sensors to the CAN bus 340.

In an example embodiment, reception of the communication at block 402 triggers the telemetry unit 310 to provide an output to the electrical system 222, for example via the power circuit 350 to energize the CAN 320. Once energized, the various CAN nodes can begin transmitting and receiving data related to the sensors and devices with which they are associated. Accordingly, the WSM 332 can provide weather-related data to the CAN bus 340, which can be received at the telemetry unit 310. In an alternative embodiment, upon reception of the communication signal at block 402, the telemetry unit can be configured to send a message to WSM 332 requesting that weather-related data be provided. The WSM 332 can be configured to provide the requested data in response to receiving the message.

At block 406, the weather-related data from the WSM 332 received at the telemetry unit 310 can be transmitted to a user. For example, the telemetry unit 310 can transmit the data to the user device 130 that initiated communication. The telemetry unit 310 can be configured with the hardware, software, and/or firmware required to generate a signal that includes the data in a format compatible with the intended communication device 130. Communication can be performed over the communications network 120.

Thus, the invention enables an operator to call up a machine and retrieve weather-related data before making a trip to the machine. If the data indicate that environmental factors preclude performance of a planned operation, an operator or fleet manager can rearrange work schedules to optimize allocation of resources, both human and machine. The system and method of the invention are not limited to the acquisition of weather-related data, but can also enable a user to retrieve other data of interest, such as, but not limited to, fluid levels and other maintenance-related data, and can enable a user to query a diagnostics module 334 to check the functionality of various devices and components at the machine 102.

Systems and methods of the present invention can also be used to alert a user, such as an operator or fleet manager, that a particular condition exists at the machine. For example, weather characteristics conducive for harvesting can be used to determine that a harvesting condition exists at a machine. Similarly, weather characteristics that satisfy government regulations and operational procedures for spraying pesticides can be used to determine that a spraying condition exists. A system can be configured to inform or alert an operator can that a predetermined condition exists.

Figure 5:
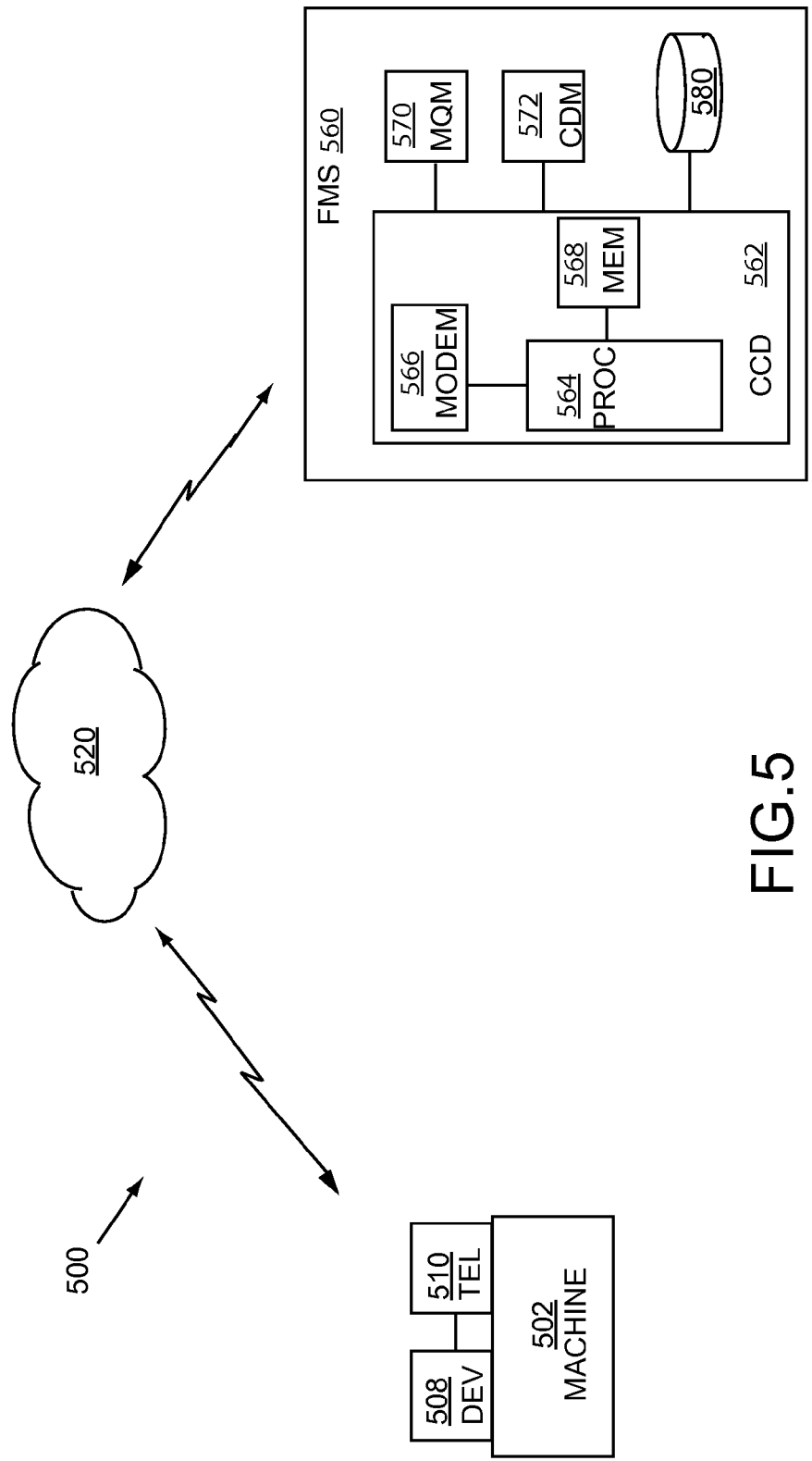
FIG. 5 shows a flow diagram of an example method.

FIG. 5 shows an example system 500 that can include an agricultural machine 502, and a telemetry unit 510 communicatively coupled to at least one device 508 at the machine 502. The device 508 can be in the form of a sensor, actuator, implement or other apparatus at the machine 502 and can be coupled to a host processor of a CAN node so that data from the device can be provided to a CAN for the machine 502. In an example embodiment, a sensor can be configured to detect a state at the machine, for example an environmental state such as, but not limited to, temperature, humidity, or air pressure, or a state of an apparatus at the machine. The device 508 can further be in the form of a diagnostic device coupled to a plurality of sensors or apparatus at the machine.

The system 500 can further include a fleet management system 560 that can include a communicative computing device (CCD) 562 comprising a processor 564 coupled to a communications modem 566 that provides communication capabilities for communicating over the communications network 520 that can include wired, wireless, cellular, circuit-switched and packet-switched communications. The CCD 562 can include a memory 568 that can comprise read-only memory (ROM) for computing capabilities and random access memory (RAM), a removable disc (not shown), and/or other device for data storage capabilities. By way of example, but not limitation, the CCD 562 can be implemented using a personal computer, a network computer, a mainframe, or microcomputer-based workstation or a smart phone, and can be configured to function as a central server. In an exemplary embodiment, the CCD 562 can be coupled to a database 580 for storing data and records in an organized structure.

In an exemplary embodiment, the FMS 560 can include a machine query module (MQM) 570 configured to cooperate with the CCD 562 to query the machine 502. The MQM 570 can comprise software, hardware and/or firmware and can be configured as a stand-alone module, for example with a dedicated microprocessor, or as a module configured for execution at the CCD 562. In an example embodiment, the MQM 570 can be configured to format a query command in a form compatible with the telemetry unit 510, which can then be transmitted by the modem 566. The MQM 570 can be configured to cooperate with CCD 562 to provide a user interface, for example displayed on a display apparatus (not shown) coupled to the CCD 562, adapted to receive user input, so that a user can request a query via the CCD 562 which can cooperate with the MQM 570 and the modem 566 to send the query or data request to the telemetry unit 510 at the machine 502. The MQM 570 can be configured to send a query at a requested time or time interval.

In an exemplary embodiment, the system 500 can send automatic queries to the machine 502. The MQM 570 can be configured to cooperate with the CCD 562 to transmit a query or a control command automatically. In an example embodiment, a user interface and input device can permit a user to specify characteristics of an automatic query, such as, but not limited to, the time or frequency of a query, the type of data desired, or the machine device to be queried.

The CCD 562 can be coupled to a condition determination module (CDM) 572 configured for using sensor data to determine a condition at the machine 502. The CDM 572 can comprise software, hardware and/or firmware and can be configured as a stand-alone module, for example with a dedicated microprocessor, or as a module configured for execution at the CCD 562.

Figure 6:
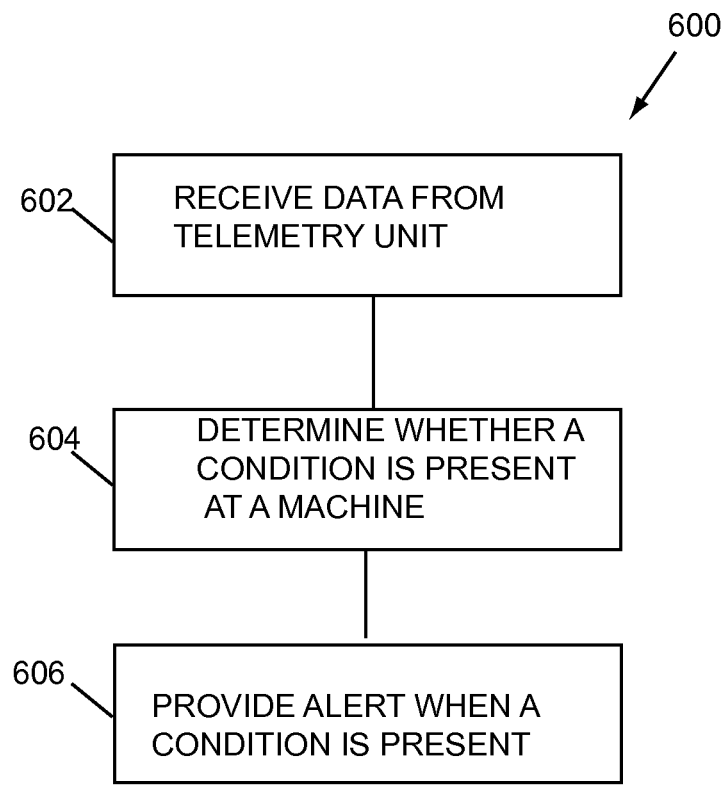
FIG. 6 shows a flow diagram of an example method.

FIG. 6 shows a flow diagram of an example method 600 for providing notice that a condition exists at a machine. At block 602, data can be received. In an exemplary embodiment, environmental data from the WSM 332 can be received at the CCD 562. For example, the telemetry unit 510 can transmit the data over the network 520. In an example embodiment, the data can be received in response to a query by the CCD 562 requesting weather data. As discussed above, a query or command communication from a user communication device to the telemetry unit 510 can energize a CAN at the machine 502, enabling its nodes to receive and transmit messages via a CAN communications bus. In a further embodiment, the data can be received without a prior request or query command. For example, while a machine is turned on, the telemetry unit 510 can be configured to automatically transmit data it receives from various CAN nodes.

At block 604 a determination can be made as to whether a predetermined condition exists at the machine 502. In an exemplary embodiment one or more predetermined conditions can be specified at the CDM 572 and defined by one or more parameters of specified values or ranges. For example, a "harvesting" condition can be defined by a moisture level that lies within a predetermined range. Similarly, a "spraying" condition can be defined by a wind speed within a predetermined range. A "rain storm" condition can be defined by an increasing volume at a rain gauge. As a further example, a "needs servicing" condition can be defined by predetermined parameters associated with various devices at the machine, such as, but not limited to, the diagnostics module 334, the ECM 322, and the ABSM 330. A "needs fuel" condition can be defined by a fuel level below a predetermined threshold. Additional conditions will occur to those skilled in the art. In addition, alerts can also be generated for the absence of a predetermined condition, defined by a parameter or characteristic that lies outside an acceptable range. For example if a field is being scheduled for spraying, and winds exceed those allowed by federal regulation during spraying procedures, a CDM can be configured to send an alert that a current state precludes performance of a particular operation.

In an example embodiment, the CDM 572 can be configured to cooperate with the CCD 562 to provide a user interface by which a user can select the conditions for which he would like to receive an alert. The CDM 572 can be configured to compare sensor data received from the telemetry unit 510 to predetermined parameters to determine whether a predetermined condition exists.

If it is determined that a particular condition does exist, an alert or notice can be provided at block 606. In an example embodiment, an alert can be in the form of a message or symbol appearing on a visual display on a display device (not shown) coupled to the CCD 562, thereby notifying a fleet manager at the FMS 560. A fleet manager can then decide whether additional steps, such as notifying an operator, are prudent. In some cases, even when an operator is at the machine, he may not be aware that a particular environmental or equipment condition is in effect, and may benefit from notification. In a further embodiment, the CCD 562 can be configured to contact an operator or manager, for example by calling or texting an operator cellular or smart phone to provide the message that a condition is present at the machine 502.

In a further example, a CDM can be located at a machine itself, as shown in FIG. 7. The telemetry unit 510 can be configured to "wake up" a CAN system at the machine 502 at periodic intervals or predetermined times. In an example embodiment, a CAN query module (CQM) 710 can be configured to control telemetry unit 510 operation to energize a CAN at the vehicle 502 at predetermined times. It can also be configured to turn a CAN off during periods in which no query is required. In an example embodiment, the CQM 710 can be configured to cooperate with an onboard computer (not shown) at the machine 502, to provide a user interface via a display device coupled to the onboard computer and a user input device such as a mouse or keyboard. For example, the CQM 710 can be configured to cooperate with a user console, such as an AGOO Command console. It is noted that while a machine is turned on, a machine CAN may be continually powered on, and the telemetry unit 510 can be configured to receive data and provide it to the CDM 572 without having to first energize the CAN.

Once energized, the CAN provide data pertaining to one or more devices 508 to the telemetry unit 510 which can provide it to the CDM 572. When a condition is present, the telemetry unit 510 can alert a user by transmitting an alert message to the communications device (CD) 530 via the communications network 520. The CD 530 can be in the form of a CCD 562 as shown in FIG. 5, or in the form of a handheld device such as a cellular or smart phone.

Thus, the present invention provides systems and methods for enabling a user, such as an operator or fleet manager, to query a machine for information pertaining to one or more devices at the machine. Because so much of agriculture work is affected and constrained by environmental conditions at a field, remote retrieval of weather data is of particular interest. However, other information, such as diagnostic information is also quite valuable. The present invention uses an onboard telemetry unit as a gateway for communication with a machine, and query and control of devices at the machine. A user can call up a telemetry unit at the machine using a cell phone or other communication device. In response to receiving a communication signal, the telemetry unit can energize a CAN system at the vehicle in order to retrieve the requested data. Gone are the days of compelling a machine operator to wake up in the middle of the night to travel a long distance to personally check weather conditions at a field.

As a further convenience, system of the invention can automatically query a machine and determine whether a predetermined condition is present, alerting an operator or FMS when a desired condition is in effect. Alternatively, an alert can be provided when a desired condition is absent. In addition to saving an individual operator unnecessary trips, the invention enables a fleet manager to better allocate resources so that the proper equipment can be assigned to fields in which conditions are conducive for performing the type of work that needs to be done.

Because the invention uses an onboard telemetry unit that many vehicles already mount on their machines, little or no expensive upfront investment is necessary to implement the invention on all vehicles in a fleet. Furthermore, it is anticipated that integrating the system into legacy machines will be a fairly straightforward and economical procedure.

Although the invention has been described with reference to non-limiting example embodiments illustrated in the attached drawings, it is noted that equivalents may be employed and substitutions made herein without departing from the scope of the invention as recited in the appended claims. For example disclosed methods can be practiced in any order and steps can be added or deleted without departing from the scope of the invention. In addition functions described as performed by a particular apparatus or module may be performed by a different or separate module or apparatus. System elements disclosed as separate can be combined or reconfigured as will occur to those skilled in the art.

What is claimed is:

1. A system for remote querying, comprising:
    a telemetry unit configured for bidirectional communication, said telemetry unit configured for coupling to a controller area network bus of an agricultural machine, the agricultural machine being a tractor, combine harvester, sprayer or windrower;
    at least one sensor coupled to said controller area network bus of said agricultural machine and configured to provide weather characteristic data; and
    wherein said telemetry unit is configured to receive communication from a remote communication device, and in response to said communication, transmit said data to said communication device.

2. The system of claim 1, wherein said telemetry unit is configured for coupling to an electrical system of said machine.

3. The system of claim 1, wherein said sensor comprises a weather station.

4. The system of claim 1, wherein said sensor is configured to detect temperature.

5. The system of claim 1, wherein said sensor is configured to detect rainfall at said machine.

6. The system of claim 1, wherein said sensor is configured to detect air pressure.

7. The system of claim 1, wherein said sensor is configured to detect humidity.

8. A method for remote weather sensing, comprising:
    receiving communication from a remote communication device at a telemetry unit, the telemetry unit coupled to a controller area network bus and an electrical system of an agricultural machine, the telemetry unit configured to receive the communication via a cellular communications network; and
    transmitting sensor data in response to receiving said communication via the cellular communications network.

9. The method of claim 8, further comprising receiving said data in response to receiving said communication.

10. The method of claim 8, wherein said transmitting sensor data comprises transmitting ambient environmental data collected from a weather station module coupled to the controller area network bus and communicated to the telemetry unit via the controller area network bus.

11. The method of claim 10, wherein said ambient environmental data comprises temperature data.

12. The method of claim 10, wherein said ambient environmental data comprises humidity data.

13. the method of claim 8, further comprising querying said sensor in response to receiving said communication.

* * * * *